No. 754,698. PATENTED MAR. 15, 1904.
W. S. REED.
AMUSEMENT APPARATUS.
APPLICATION FILED FEB. 28, 1903.
NO MODEL.
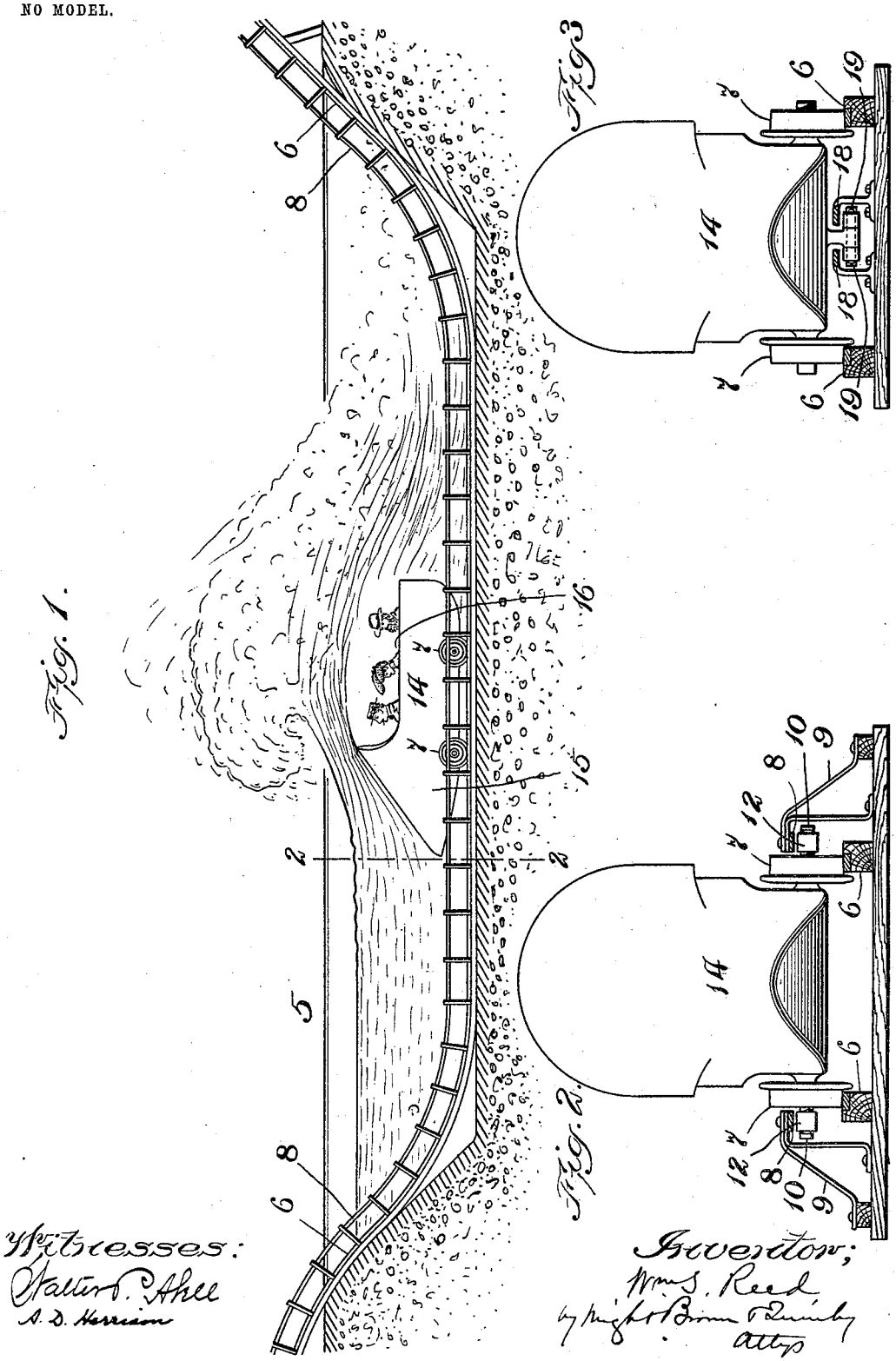

No. 754,698. Patented March 15, 1904.

UNITED STATES PATENT OFFICE.

WILLIAM S. REED, OF LEOMINSTER, MASSACHUSETTS, ASSIGNOR TO JAMES A. TIRRELL, TRUSTEE, OF BOSTON, MASSACHUSETTS.

AMUSEMENT APPARATUS.

SPECIFICATION forming part of Letters Patent No. 754,698, dated March 15, 1904.

Application filed February 28, 1903. Serial No. 145,487. (No model.)

*To all whom it may concern:*

Be it known that I, WILLIAM S. REED, of Leominster, in the county of Worcester and State of Massachusetts, have invented certain new and useful Improvements in Amusement Apparatus, of which the following is a specification.

This invention relates to an amusement apparatus comprising a boat-shaped car or vehicle adapted to run on a track and formed so that when projected with sufficient speed through a body of water it will deflect the water through which it passes in such manner as to prevent the water from coming in contact with the occupant of the vehicle.

The invention has for its object to provide an apparatus of this character comprising a track adapted to guide a boat-shaped car or vehicle through a body of water and to prevent liability of derailment of the car at any point.

The invention consists in the improvements which I will now proceed to describe and claim.

Of the accompanying drawings, forming a part of this specification, Figure 1 represents a side elevation of a portion of a track or railway and a car thereon embodying my invention, together with a representation in section of a tank or reservoir containing a body of liquid in which a portion of the track is submerged. Fig. 2 represents a section on line 2 2 of Fig. 1, together with an end view of the boat-shaped car or vehicle. Fig. 3 represents a view similar to Fig. 2, showing a modification.

The same reference characters indicate the same parts in all the figures.

In the drawings, 5 represents a tank or reservoir containing a body of water or other suitable liquid.

6 6 represent track-rails adapted to support and guide the wheels 7 7 of a boat-shaped car or vehicle. The track formed by said rails has a depressed portion located within the tank 5 and submerged in the liquid therein, elevated portions outside the tank and inclined portions connecting the depressed and the elevated portions, the said portions forming a continuous track so arranged that a car can move from one elevated portion down one of the inclines through the body of liquid in which the depressed portion is submerged and out of said liquid up the other incline upon the other elevated portion. 8 8, Figs. 1 and 2, constitute inverted guard-rails which extend parallel with the track-rails 6 6 and are located above the same in position to coöperate with projections extending from the car under the said guard-rails. The guard-rails 8 are here shown as supported by brackets 9, and the projections on the car are formed by the extended ends of the trunnions or arms 10, on which the wheels 7 are journaled. Said projections are preferably provided with small wheels or antifriction-sleeves 12, adapted to have a rolling contact with the guard-rails 9 in case the wheels 7 rise from the track-rails 6.

It will be seen that the guard-rails 8 and projections 10 prevent liability of the derailment of the car, particularly when the latter is passing through the body of water, so that its specific gravity is reduced, and its tendency to leave the rails 6 is correspondingly increased. Said projections and guard-rails coöperate at all parts of the track in preventing derailment, and thus contribute to the safety of the apparatus as a whole.

In Fig. 3 I show guard-rails 18 18, located between the track-rails 6 6, and coöperating projections 19 19, affixed to the bottom of the car or vehicle and extending under the guard-rails 18.

The track-rails 6 6, with their supports, may be disposed to form an endless track, a portion of which is depressed and located in the tank or reservoir 5.

The body 14 of the vehicle has a pointed substantially or approximately conical front end 15, constituting a deflector, and a hold or passenger-containing portion 16. The deflector 15 extends above the upper edge of the hold portion 16, so that when the vehicle is passing rapidly through the water the water will be displaced by the deflector and will pass over persons seated in the hold without coming in contact therewith. The hold preferably extends to the extreme rear end of the body, so that a relatively large number of passengers can be accommodated.

It will be seen that by providing the boat-shaped vehicle with wheels at its lower portion, adapted to run upon a track which is submerged within a body of water, and, further, by providing means for preventing the derailment of the vehicle while it is passing through the water, I have provided a safe and reliable amusement apparatus which is unobstructed overhead, having no upwardly-extending projections or hangers to agitate and cut the surface of the water and obstruct the view of the passengers.

I regard means for preventing the derailment of the car while it is in the water of great importance, and as I believe myself to be the first to provide an apparatus of this character with such means I do not limit myself to the devices here shown and described, as any equivalent means may be used without departing from the spirit of my invention.

Means may be employed for raising the vehicle to the higher portion of the track—viz., the portion from which the vehicle runs by gravitation to acquire the momentum which forces it through the water. I do not limit myself, however, to the utilization of the force of gravitation to carry the vehicle through the water, and I may drive the vehicle by power applied by means of a cable or otherwise.

I claim—

1. An apparatus of the character stated, comprising a track having elevated portions and a depressed portion, a body of water in which the depressed portion of the track is submerged, and a vehicle having wheels adapted to run on said track, the body of said vehicle having a pointed front adapted to displace the water and prevent its entrance into the body of the vehicle, the said vehicle being guided by the track into, through, an out of the water.

2. An apparatus of the character stated, comprising a track having elevated portions and a depressed portion, inverted guard-rails parallel with the track, a body of water in which the depressed portions of the track and guard-rails are submerged, and a vehicle having wheels adapted to run on the track and projections extending under the guard-rails, the body of said vehicle having a pointed front adapted to displace the water, the said vehicle being guided by the track into, through, and out of the water and prevented from derailment while in the water by said guard-rails and projections.

3. An apparatus of the character stated, comprising a track having elevated portions and a depressed portion, a body of water through which the depressed portion passes, the portion of the track entering the water being inclined, to send a car through the water by gravitation, a car having wheels adapted to run on the track, and means for preventing the derailment of the car while it is in the water.

4. A vehicle of the character stated, comprising a body having a pointed or substantially conical front end forming a water-deflector, and a hold extending from the said deflector to the rear end of the vehicle, the upper portion of the deflector being above and in advance of the hold, and wheels connected with the lower portion of said body and adapted to run therewith through a body of water.

In testimony whereof I have affixed my signature in presence of two witnesses.

WILLIAM S. REED.

Witnesses:
 HORACE BROWN,
 A. D. HARRISON.